L. D. KELSO.
POWER APPLYING MEANS FOR TRACTION WHEELS.
APPLICATION FILED AUG. 7, 1915.
1,181,079.
Patented Apr. 25, 1916.
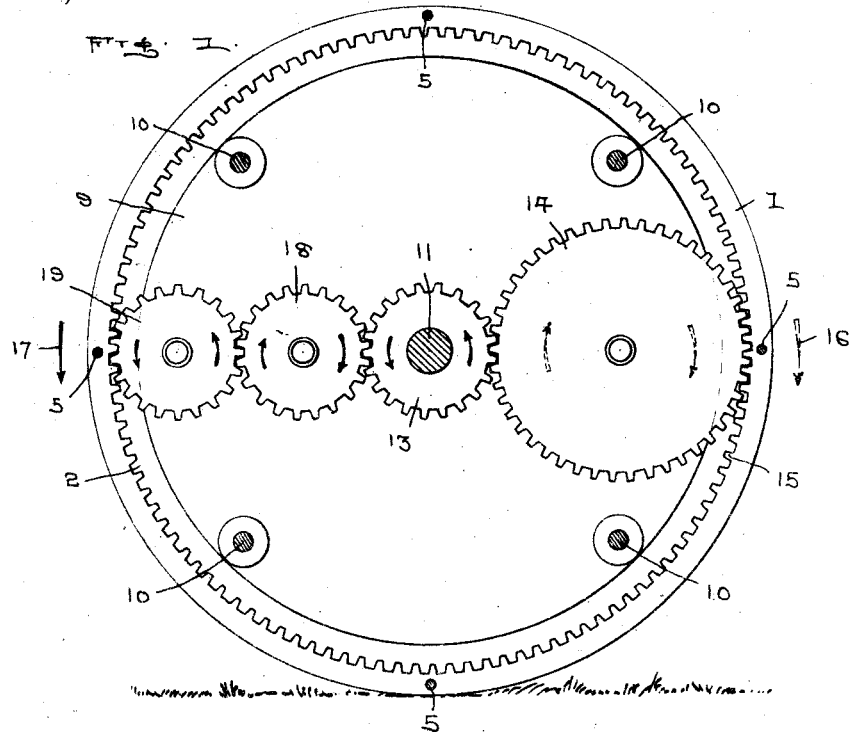
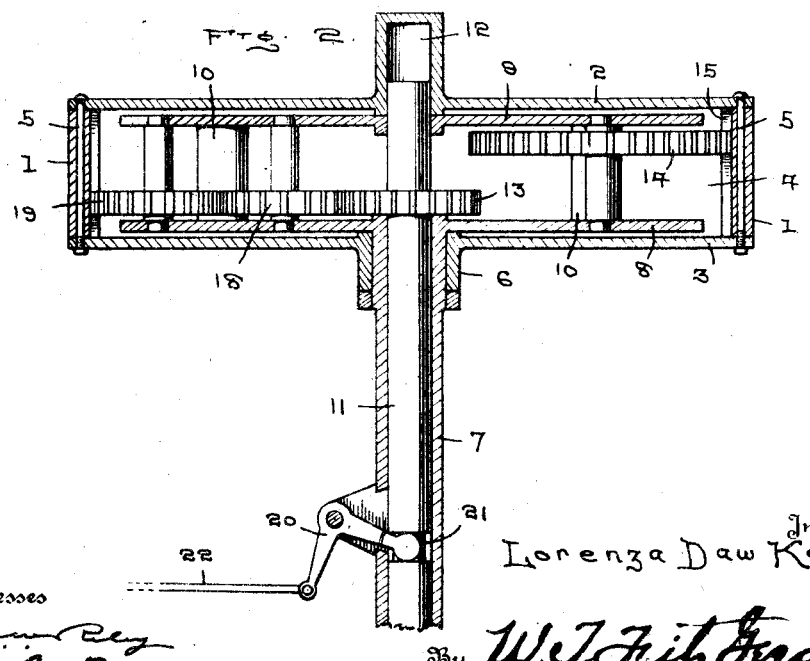
Witnesses
Inventor
Lorenzo Daw Kelso
By W. J. Fitzgerald
Attorney

UNITED STATES PATENT OFFICE.

LORENZA DAW KELSO, OF CLEVELAND, OKLAHOMA, ASSIGNOR OF ONE-TENTH TO E. M. THOMPSON, OF CLEVELAND, OKLAHOMA, FIVE ONE-HUNDREDTHS TO E. R. PERRY, FIVE ONE-HUNDREDTHS TO A. D. CLIFTON, AND ONE-FIFTH TO E. C. MULLENDORE.

POWER-APPLYING MEANS FOR TRACTION-WHEELS.

1,181,079.  Specification of Letters Patent. Patented Apr. 25, 1916.

Application filed August 7, 1915. Serial No. 44,163.

*To all whom it may concern:*

Be it known that I, LORENZA DAW KELSO, a citizen of the United States, residing at Cleveland, in the county of Pawnee and State of Oklahoma, have invented certain new and useful Improvements in Power Applying Means for Traction-Wheels; and I do hereby declare the following to be a full, clear, and exact description of the invention, such as will enable others skilled in the art to which it appertains to make and use the same.

My invention relates to new and useful improvements in power applying means for traction wheels and my object is to provide a wheel having a broad tread for use in connection with motor propelled vehicles for hauling heavy loads.

A further object is to provide a driving mechanism within the wheel for applying rotary motion to the wheel.

A further object is to provide means for applying power to the driving mechanism. And a further object is to provide means for reversing the rotation of the wheel.

Other objects and advantages will be hereinafter set forth and more particularly pointed out in the accompanying specification.

In the accompanying drawings which are made a part of this application, Figure 1 is an elevation of the wheel, showing one face plate thereof removed, and Fig. 2 is a horizontal central sectional view through the wheel.

Referring to the drawings in which similar reference numerals designate corresponding parts throughout the several views, 1 indicates the rim or tread of the wheel, to the edges of which are attached plates 2 and 3, which plates form closures on opposite sides of the rim and when attached to the rim form a hollow space 4, the plates being held in position by extending bolts 5 transversely through the plates at their edges and the interposed portion of the rim. At the axial center of the plate 3 is formed a hub 6 through which extends a hollow axle 7, that end of the axle projecting within the hollow space 4 having a circular flange 8 integral therewith of less diameter than the diameter of the interior of the rim 1, a similar flange 9 being positioned adjacent the plate 2 and connected to the flange 8 by spacing bars 10 to hold the flange 9 in proper position and fixed to the flange 8. A driving shaft 11 is extended through the hollow axle 7, through the flange 8 and has its outer end seated in a socket 12 at the axial center of the plate 2, said socket being so arranged that the driving shaft may move longitudinally therein. Fixed to that portion of the driving shaft 11 extended through the hollow space 4 is a shifting gear 13 which is adapted to be moved into engagement with the driving gear 14 carried by the flanges 8 and 9 and rotatable therebetween, said driving gear 14 meshing with cogs 15 on the inner face of the rim 1, and when the shifting gear 13 is so engaged and rotating power applied to the driving shaft 11, the wheel structure will be driven in the direction indicated by the arrow 16, or forwardly. In order to drive the wheel structure in the opposite direction, or rearwardly, as indicated by the arrow 17, a pair of gears 18 and 19 are rotatably mounted between the flanges 8 and 9, the gear 13 meshing with the gear 18 and the gear 18 in turn meshing with the gear 19, and the gear 19 meshing with cogs 15 of the wheel structure.

The shaft 11 is connected in any suitable manner to the usual or any preferred form of differentiating gear (not shown) and is movably engaged therewith so that the gear 13 may be readily shifted into engagement with either the gear 14 or gear 18, the shifting of the shaft being accomplished in any preferred manner, as by means of a bell crank lever 20, one arm of which is bifurcated and enters a circumferential channel 21 in the shaft 11, while the opposite arm of the lever has a rod 22 connected therewith by means of which the bell crank lever may be rocked on its pivot and the shaft moved back and forth longitudinally.

This structure is designed primarily for use in connection with a slower traveling vehicle, such as is used in farm work or for hauling extremely heavy loads, and by applying the driving power in the manner shown, a much larger load may be hauled without increasing the horsepower of the engine. It will likewise be seen that in view of the fact that the gear 14 has a tendency to climb upwardly on the cogs when rotating power is applied thereto, the weight of the load will assist in directing driving power on the wheel structure.

Having thus fully described my invention what I claim as new and desire to secure by Letters Patent of the United States, is:—

1. A means for applying power to traction wheels, comprising a hollow wheel structure having interiorly arranged cogs, a pair of spaced flanges stationary within said wheel structure, a gear rotatably mounted adjacent one of the flanges and meshing with said cogs, a pair of gears adjacent the opposite flange and on the opposite side of the axis of the wheel structure from the first mentioned gear, said gears intermeshing with each other and one of the gears intermeshing with the cogs of the wheel structure, a driving shaft extending through the wheel structure and longitudinally movable therein, and a shifting gear fixed to said driving shaft adapted to be moved to engage the first mentioned gear or one of the pairs of gears whereby the rotation of the wheel structure will be reversed, and means to move the driving shaft longitudinally.

2. A power wheel and means to operate the same, comprising a rim having cogs arranged interiorly thereof, a plate at each edge of the rim, means to secure the plates to the rim, a pair of flanges within the rim and between said plates, a hollow stationary axle carrying said flanges, a gear rotatably mounted between the flanges and projecting beyond the edges thereof and into engagement with the cogs of the rim, a pair of gears on the opposite side of the axis of the flanges from the first mentioned gear, said gears being intermeshing and one meshing with the cogs of the rim, a driving shaft rotatably and slidably mounted in the axle and extended through the wheel structure, a shifting gear carried by said shaft adapted to be moved into engagement with the first mentioned gear or with one of the second mentioned gears to change the travel of the wheel structure, and means to move the shaft longitudinally.

In testimony whereof I have signed my name to this specification in the presence of two subscribing witnesses.

LORENZA DAW KELSO.

Witnesses:
E. C. MULLENDORE,
O. S. HOLROYD.